United States Patent
Smith et al.

(10) Patent No.: US 7,261,611 B1
(45) Date of Patent: Aug. 28, 2007

(54) AQUATIC SURFACE SKIPPING TOY DEVICE

(76) Inventors: George I Smith, 5130 Foxhall Pl., West Palm Beach, FL (US) 33417; Doug Smith, 5130 Foxhall Pl., West Palm Beach, FL (US) 33417

( * ) Notice: Subject to any disclaimer, the term of this patent is extended or adjusted under 35 U.S.C. 154(b) by 485 days.

(21) Appl. No.: 10/426,783

(22) Filed: Apr. 30, 2003

(51) Int. Cl.
   *A63H 23/02* (2006.01)
   *A63H 23/00* (2006.01)
   *B63B 1/00* (2006.01)

(52) U.S. Cl. ............ 446/160; 446/61; 446/153; 446/154; 446/176; 473/569; 441/65

(58) Field of Classification Search ........ 441/65, 441/129, 79; 446/160, 61, 68, 153, 154, 446/176; 114/253; 472/129
See application file for complete search history.

(56) References Cited

U.S. PATENT DOCUMENTS

| | | | | |
|---|---|---|---|---|
| 1,736,156 A | * | 11/1929 | Harter | 441/66 |
| 2,910,708 A | * | 11/1959 | Albright | 441/65 |
| 2,930,338 A | * | 3/1960 | Flomenhoft | 114/279 |
| 3,200,421 A | * | 8/1965 | Williams | 441/65 |
| 3,561,025 A | * | 2/1971 | Teach | 441/65 |
| 3,747,138 A | * | 7/1973 | Morgan | 441/74 |
| 4,463,954 A | | 8/1984 | Panse et al. | |
| 4,507,096 A | | 3/1985 | Greenfield, Jr. | |
| 4,729,333 A | * | 3/1988 | Kirby et al. | 114/244 |
| 5,057,050 A | | 10/1991 | Hill | |
| 5,078,639 A | * | 1/1992 | Kippen | 446/61 |
| 5,364,299 A | | 11/1994 | Hill et al. | |
| 5,766,051 A | * | 6/1998 | Messer | 441/65 |
| 5,846,108 A | * | 12/1998 | Milford | 441/67 |
| 5,979,351 A | * | 11/1999 | Fleischman et al. | 114/253 |
| 6,102,760 A | * | 8/2000 | Seigler | 441/65 |
| 6,241,570 B1 | | 6/2001 | Thorne, III | |

\* cited by examiner

*Primary Examiner*—Dmitry Suhol
(74) *Attorney, Agent, or Firm*—McHale & Slavin, P.A.

(57) ABSTRACT

The present invention relates to an aquatic toy device that is particularly adapted for skipping upon and across the irregular surface of a body of water. The aquatic surface skipping toy device may be used for recreation, sports, or exercise either by an individual or a group of individuals. The toy device includes a buoyant body having a generally planar bottom surface and a pair of outwardly and forward mounted sponsons constructed and arranged to convert forward motion into hydrodynamic lift to raise the bottom surface of the toy device into a position above the surface of the water. As the bottom surface is extended above the surface of the water the air is channeled between the lower surface of the toy device and the upper surface of the water. Allowing the toy device to glide predominately on a thin layer of air with the sponsons alternatingly skipping across the surface of the water.

11 Claims, 7 Drawing Sheets

AQUATIC SURFACE SKIPPING TOY DEVICE

FIELD OF THE INVENTION

This invention relates generally to the field of aquatic toys, and more particularly to a surface-skipping toy device that may be used for recreation or exercise by one or more participants.

BACKGROUND OF THE INVENTION

Through the years, a virtually endless array of toys and amusement articles have been created to entertain and amuse children of varying ages. The utilization of projectiles, especially balls, discs or other aerodynamically shaped objects for throwing through the atmosphere, is quite well known. Ball games go back to antiquity in terms of being used for both recreation and exercising. Surface skimming projectiles, such as hockey pucks, have also been used for sporting events wherein the objective is to direct the projectile into a net.

Water sports have also employed balls as game projectiles for games such as volleyball, water polo or basketball wherein the participants pass the ball to each other through the air. The spherically shaped balls generally do not exhibit desirable characteristics for use along the surface of the water as a surface skipping projectile nor do they have any appreciable range when used in this manner.

Other aquatic toy devices have been specifically designed for recreational use in water or along the surface of the water. Such devices are typically intended to stay in contact with the water at the air-water interface or are designed to remain under the surface of the water. A representative example of an air-water interface type of aquatic device is shown in U.S. Pat. No. 4,463,954 to Panse. The Panse patent shows a disc shaped device having a frusto-conical shaped lower surface specifically designed to remain in contact with the water surface without skipping or jumping. The device is manually propelled by throwing so as to smoothly skim along the surface at the air-water interface. Because this type of device remains in contact with the water, its effective range is relatively short. If used in choppy or rough water this type of device is likely to dig into the water and cause the device to tumble and/or stop abruptly.

A representative example of a device designed to stay under the surface of the water is shown in U.S. Pat. No. 6,241,570 to Thorne. The Thorne patent shows a disc shaped device having a symmetrically shaped top and bottom surface to minimize drag inducing lift effects as the device travels through the water. In operation, the device is thrown or pushed by hand to cause the disc to glide through the water and remain under the surface. The device can be used as a diving plane by scuba divers.

Aquatic recreational devices, as represented by the prior art generally utilize shapes that are not suited for skipping across the surface of water. The prior art is especially ineffective when the water surface is rough, choppy or contains waves such as that found along the coast line. In addition, the prior art devices are incapable of traveling more than short distances due to drag caused by contact with the water surface.

The prior art has also suggested toy devices which glide through the air in close proximity to a smooth surface. For example, U.S. Pat. Nos. 5,057,050 and 5,364,299 to Hill disclose Surface Skimming Toys having a generally planar base with a flat under surface. An upwardly extending fin is joined to the upper surface of the base member and one embodiment discloses an aesthetic body supported on the upper surface. The toy is launched in close proximity to a smooth extended surface and assumes a skimming travel in close spacing to the surface while being supported on a thin layer of air.

Another device which glides through the air in close proximity to a smooth surface is disclosed in U.S. Pat. No. 4,507,096 to Greenfield. Greenfield discloses a Ground Effect Toy in which an elongated generally rectangular member is inclined at an acute angle with a surface over which the toy may be thrown. Continuously adjacent along the longitudinal edges and pending downwardly therefrom are two side skirts preferably having an acute triangular shape. In its preferred form a dorsal fin is disposed near the trailing edge of the toy.

These prior art flying devices are only capable of maintaining the air cushion required to suspend the vehicle while traveling parallel and in close proximity to a smooth surface. The devices are generally incapable of maintaining the air cushion over rough surfaces such as those found in water especially around the coast line. The devices are also constructed of very light materials that would not allow these devices to maintain the energy required to skip off of a water surface and continue forward travel. Because these devices must remain in very close proximity to a smooth surface, they are incapable of being jumped or skipped off of waves and maintaining the air cushion or regenerating a new air cushion.

In addition, there remains a continuing need in the art for ever more improved and varied types of toys and amusement articles.

SUMMARY OF THE INVENTION

It is an objective of the invention to provide an aquatic surface skipping toy device.

It is another objective of the invention to provide a an aquatic surface skipping toy device having hydrodynamic and aerodynamic operation.

It is yet another objective of the invention to provide an aquatic surface skipping toy device having sponsons constructed and arranged to provide hydrodynamic lift, and a hull constructed and arranged to channel air beneath the toy to allow the toy to glide on a cushion of air.

It is still another objective of the invention to provide an aquatic surface skipping toy device having sponsons constructed and arranged to allow the toy to skip or jump over water surface irregularities and continue forward motion.

It is still yet another objective of the invention to provide an aquatic surface skipping toy device which is characterized by increased range and increased velocity when manually thrown or otherwise projected by a user across a surface of a body of water.

It is a further objective to provide an aquatic surface skipping toy device which is capable of utilizing forward motion to skip off of irregularities on the water surface and regenerating an air cushion under the hull of the device for extended forward travel.

In accordance with the above objectives, an aquatic surface skipping toy device is provided. The toy device is particularly adapted for skipping upon and across the irregular surface of a body of water. The aquatic surface skipping toy device may be used for recreation, sports, or exercise either by an individual or a group of individuals. The toy device includes a buoyant body having an upper portion and a lower portion, a bow portion and a stern portion. The lower portion includes a generally planar bottom surface and a pair of outwardly and forwardly mounted sponsons constructed and arranged to convert forward motion into hydrodynamic lift to raise the bottom surface of the toy into a position above the surface of the water. As the bottom surface is extended above the surface of the water, air is directed between the lower surface of the toy device and the upper surface of the water. The underside of the hull is used to compress the incoming airstream when the toy is in motion to provide an aerodynamic lift force on the underside of the hull. The hydrodynamic lift forces generated by the sponsons allow the toy to glide predominately on a thin layer of air with the sponsons alternatingly skipping across the surface of the water. As the toy device encounters a surface obstruction such as a wave or ripple on the surface of the water the sponsons are constructed to allow the toy device to travel across the obstruction and maintain forward motion while enhancing the skipping action of the toy device. For further control of the device a means may be provided for turning and yaw control of the toy device.

DETAILED DESCRIPTION OF THE INVENTION

Although the invention will be described in terms of a specific embodiment, it will be readily apparent to those skilled in this art that various modifications, rearrangements, and substitutions can be made without departing from the spirit of the invention. The scope of the invention is defined by the claims appended hereto.

A presently preferred embodiment of the aquatic toy device is illustrated in FIGS. 1-6. The aquatic toy device 10 illustrated herein as a boat including a generally rectangular buoyant hull 12 having an upper portion 14, a lower portion 16, a bow portion 18, and a stern portion 20 together forming the buoyant hull. It will be understood however, that while the hull is illustrated as a rectangle it may take the form of any suitable shape in accordance with the principles of the invention. Fixedly secured to the buoyant hull is a pair of forward sponsons 22 extending downwardly and rearwardly from said upper portion 14 of said hull 10, the sponsons 22 being spaced apart and lying on opposite sides of the longitudinal centerline of the hull 10. The sponsons 22 each having a generally flat planing surface 22A that extends below the lower portion 16 of the hull. In a non-limiting preferred embodiment the sponsons 22 extend downwardly at about a twenty degree angle in relation to the lower portion 16 of the hull 12 and about one quarter of an inch below the lower portion 16 of the hull 12. Alternatively other suitable sponson designs well known in the art capable of generating suitable hydrodynamic lift may be utilized. The bow portion 18 of the hull 12 extends between the sponsons 22 and preferably slopes downwardly and rearwardly at about the same angle as the sponsons 22. During forward motion of the toy 10 the bow portion 18 channels air under the generally planar lower portion 16 of the hull 12 such that the air is compressed between the lower portion of the hull 16 and the upper surface of the water generally separating the water from the lower portion 16 of the hull 12 and providing supporting lift for reduced drag. The reduction in drag allows the toy 10 to travel considerably farther across the water surface than would be normally possible.

Figure 1:
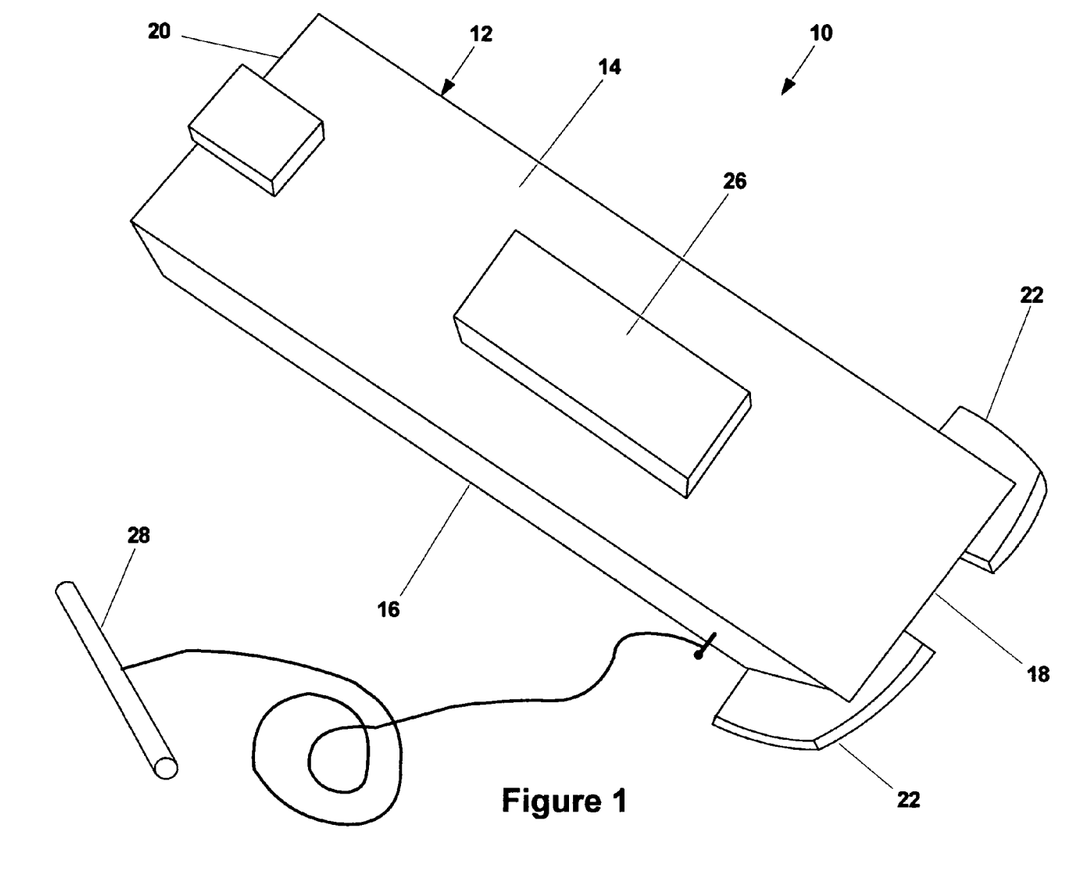
FIG. 1 is a perspective view of a preferred embodiment of the aquatic toy device of the present invention.
Figure 2:
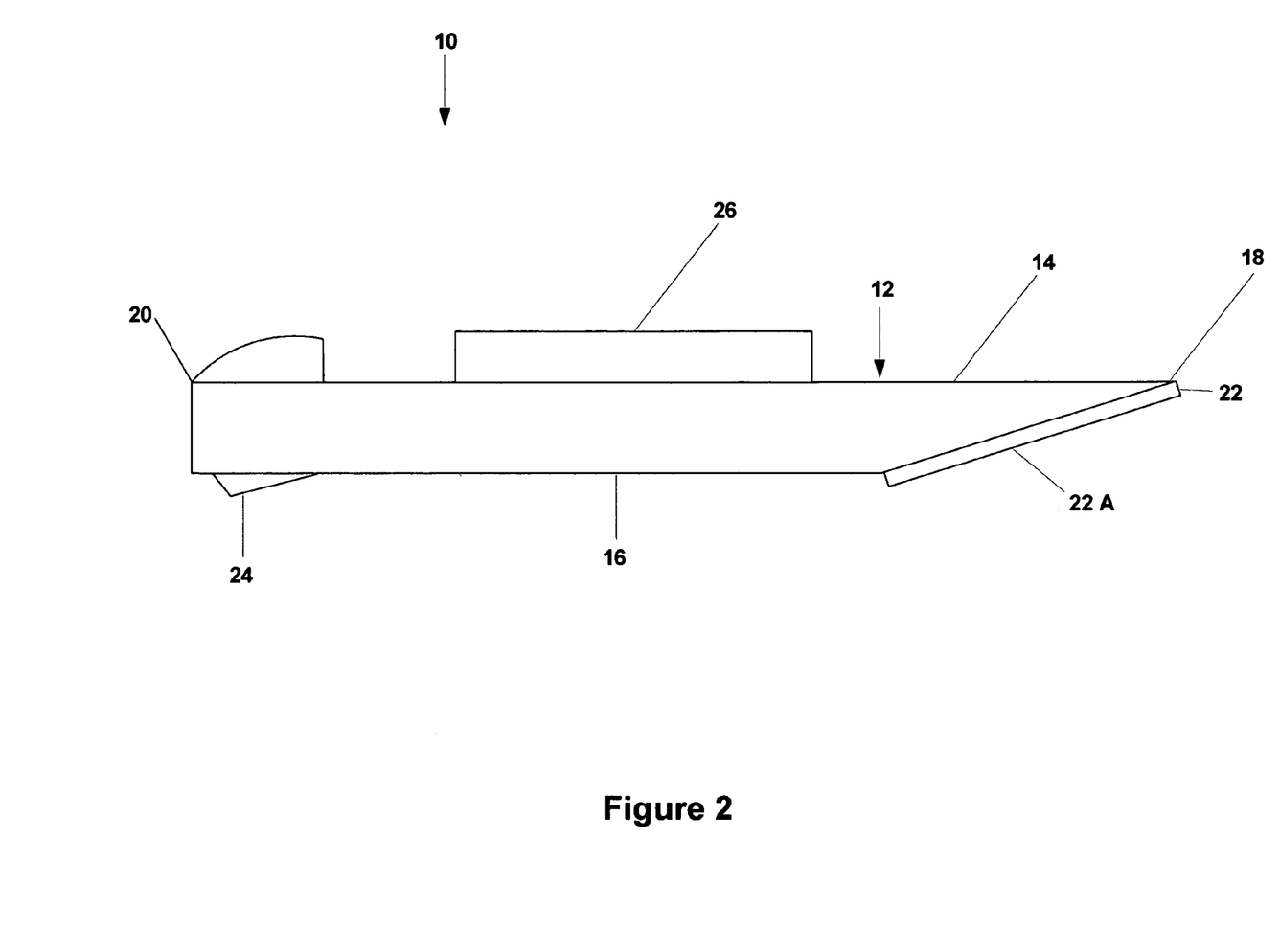
FIG. 2 is a side view of the aquatic toy device of the present invention.
Figure 3:
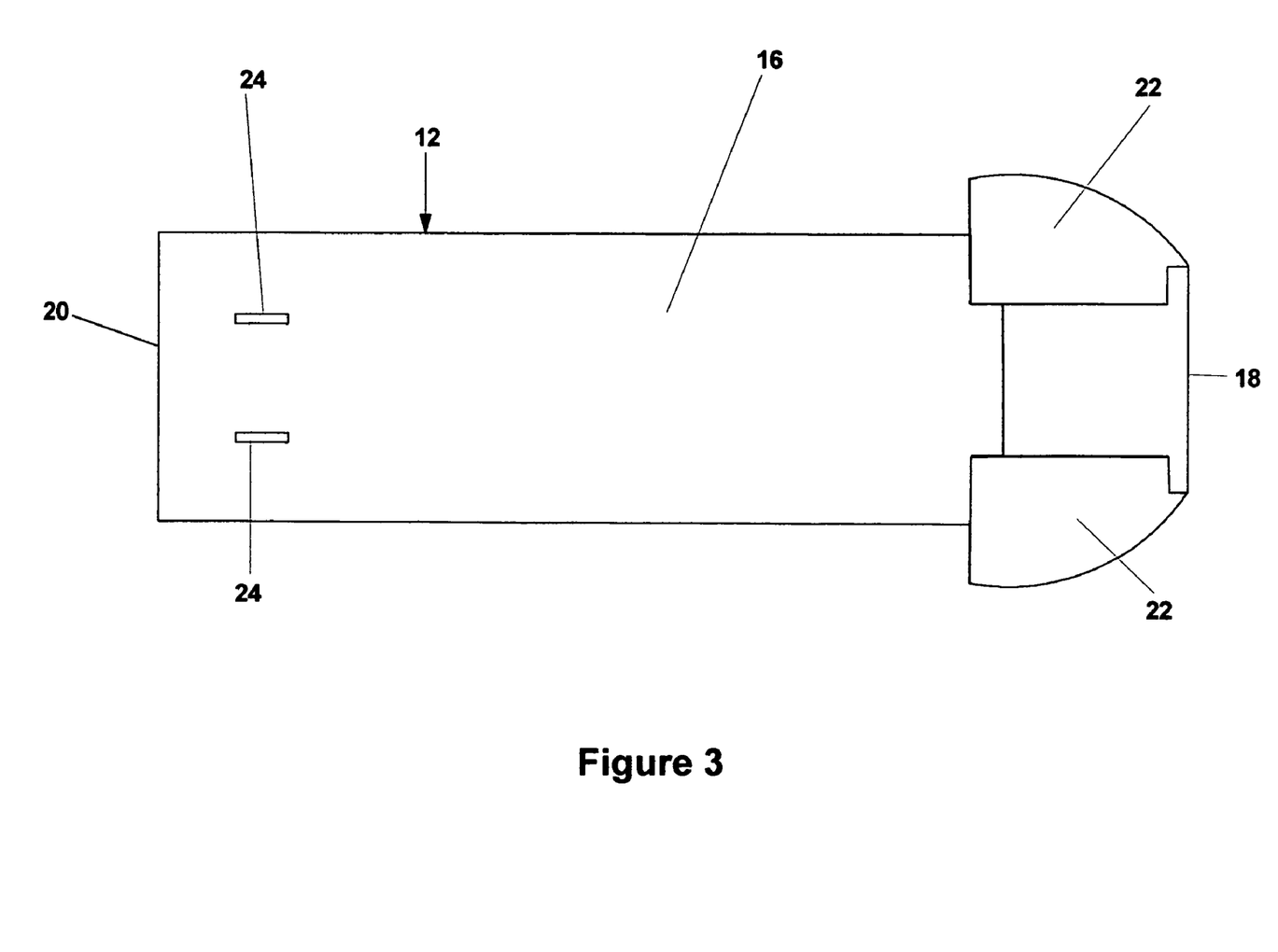
FIG. 3 is a bottom view of the aquatic toy device of the present invention, illustrating the sponsons and one embodiment of the guidance means.
Figure 4:
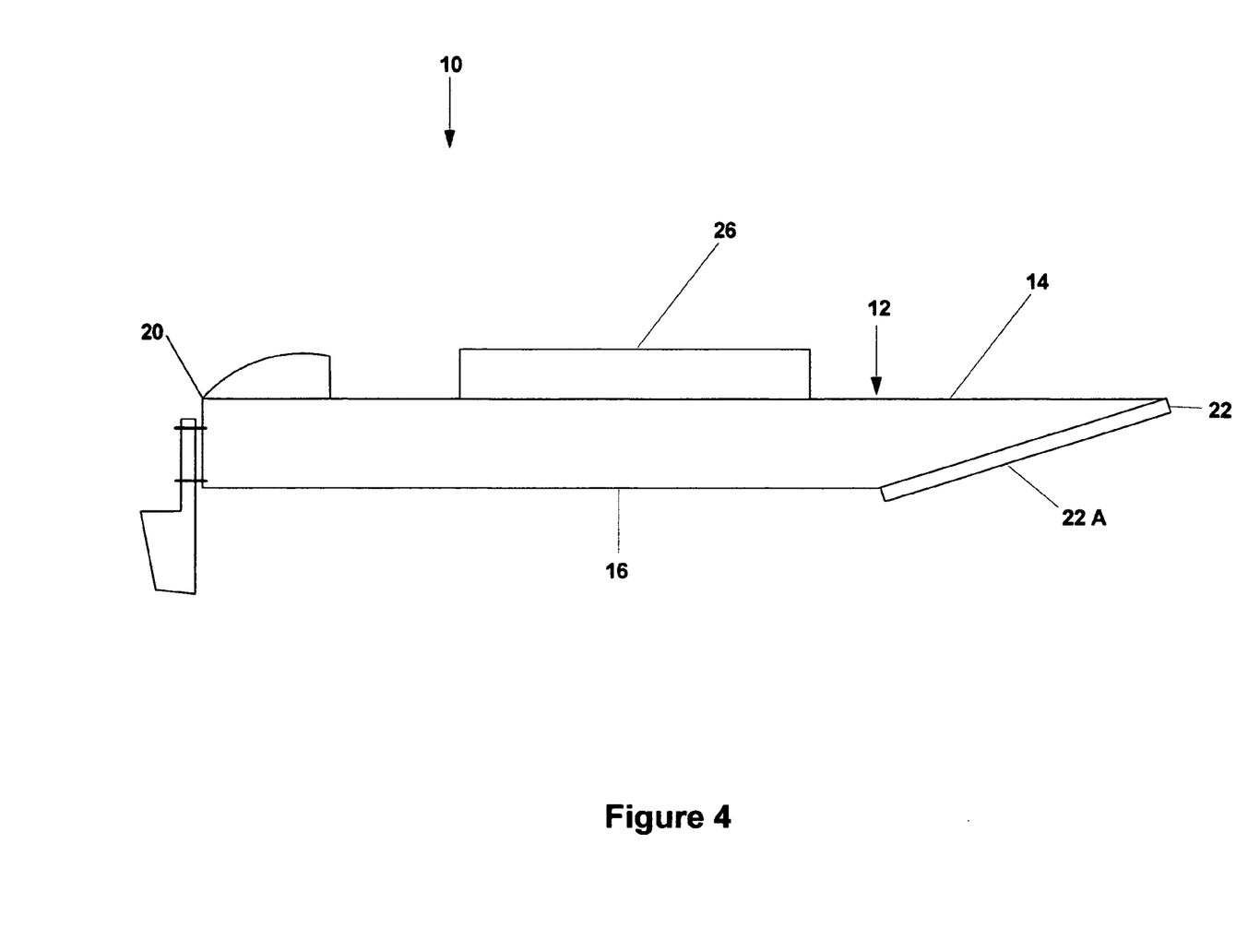
FIG. 4 is a side view of the aquatic toy device illustrating an alternative embodiment of the guidance means.
Figure 5:
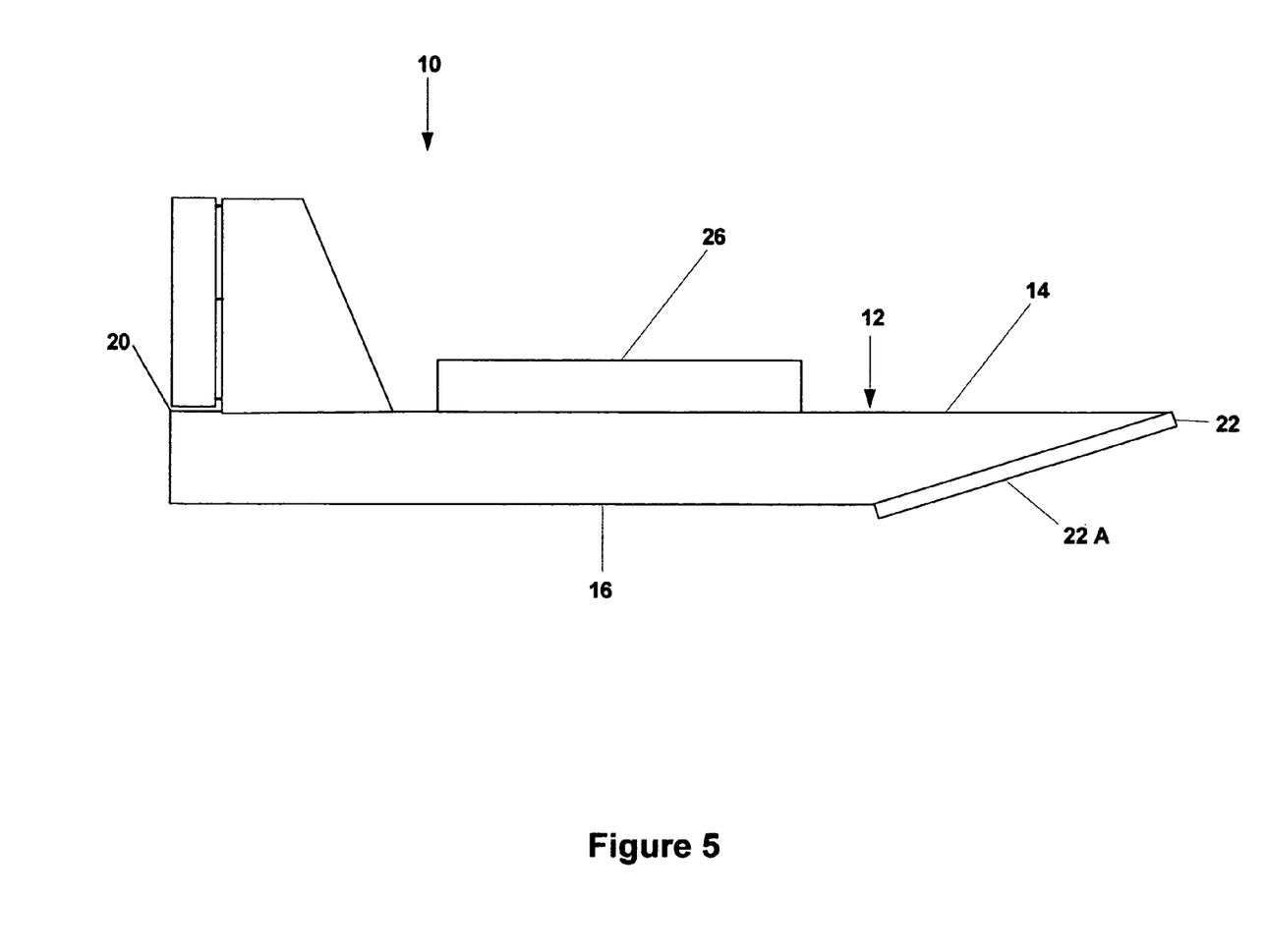
FIG. 5 is a side view of the aquatic toy device illustrating an alternative embodiment of the guidance means.

The toy device 10 may optionally include at least one guidance means for enhancing the directional guidance of the aquatic toy device across the surface of the body of water. The guidance means may be manually or remotely positionable for directional control. The preferred guidance means is illustrated herein as a keel 24 which extends downwardly and parallel in relation to the longitudinal centerline of the hull 12. Alternatively, other types of guidance means suitable for guiding the toy device may include, but should not be limited to, a rotatably mounted rudder extending downward from the lower portion of the hull or an upwardly extending fin secured to the upper portion 14 of the hull 12 wherein the upwardly extending fin is constructed and arranged to produce a directed airflow during forward motion of the aquatic toy 10.

The toy device 10 preferably includes at least one gripping means illustrated herein as a handle 26 for manually grasping and projecting said aquatic toy device 10. The handle 26 is generally centrally positioned and secured to the upper portion 14 of the hull 12. The upper portion 14 of the hull 12 may also optionally include at least one ballast means (not shown) generally positioned proximate to the bow portion 18 of the hull 12 and symmetrically disposed with respect to the longitudinal centerline of the hull 12. The ballast means may include, but should not be limited to, metal weights or containers which may be filled with fluid, sand or metal beads or combinations thereof. The upper portion 14 of the hull may also optionally include aesthetic bodies or a plurality of components which provide aesthetic appeal to the toy 10.

The toy device 10 is preferably constructed of wood but may be constructed of other suitable material(s) which may include but should not be limited to plastic, foam, rubber, metal, fiber glass, carbon fiber or suitable combinations thereof.

Figure 6:
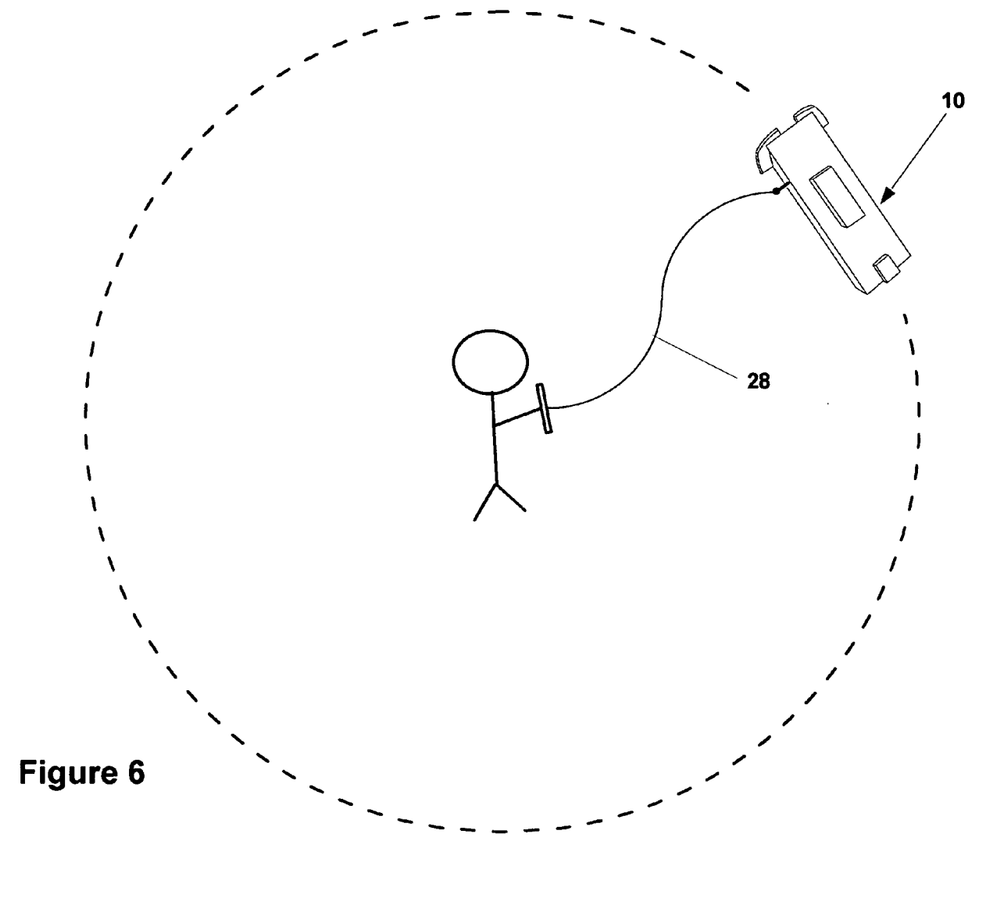
FIG. 6 is a perspective view illustrating the present invention being utilized in conjunction with a control line.

Referring to FIG. 6, the toy device is illustrated in use with an optional control line 28. The control line 28 is removably attached to a attachment means secured to the side of the hull 12 and is constructed and arranged to allow the operator to direct the toy in a generally circular path for one player use. The control line generally includes a suitable handle and a suitable length of string. In the preferred non-limiting embodiment the control line utilizes a wooden dowel rod for the handle and about twenty feet of nylon string.

Figure 7:
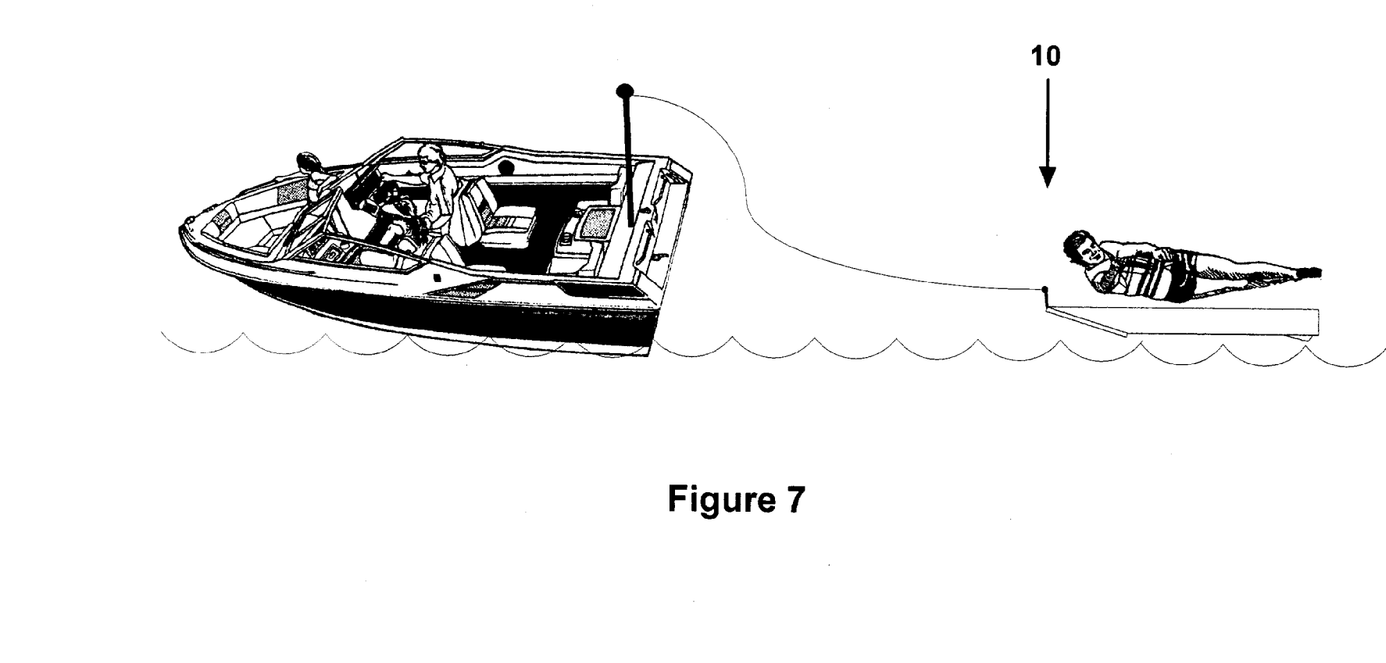
FIG. 7 is a perspective view illustrating an alternative embodiment of the present invention being utilized in conjunction with a motorized boat.

In an alternative embodiment the toy device may be constructed large enough to carry at least person. In this embodiment the toy device may be pulled by a motorized boat or other suitable device capable of pulling the toy device across a water surface. This embodiment may include a rubber mat or other suitable non-skid or padded surface on the upper portion of the toy device.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An aquatic toy device which is directed by hand across a surface of a body of water, said toy device comprising:
    a buoyant hull including an upper portion, a lower portion, a bow portion, and a stern portion arranged about a longitudinal centerline, said upper portion including a means for grasping said aquatic toy for projecting said aquatic toy across the surface of a body of water, said lower portion including a substantially planer lower surface for maintaining a cushion of air between said bottom surface and said water surface, said bow portion including a substantially planer front surface, said front surface sloping downwardly and rearwardly from said upper portion to said lower portion of said hull;
    a pair of forward sponsons secured to said bow surface, said forward sponsons depending downwardly from said upper portion of said hull and extending toward the stern portion of said hull, said sponsons being spaced apart and lying on opposite sides of said longitudinal centerline of said hull, said sponsons each having a generally flat planing surface for providing lift and an inner surface constructed and arranged to direct air from said front surface to said lower surface,
    whereby said aquatic toy is constructed and arranged to be projected across the surface of said body of water by hand, whereby during forward motion of said aquatic toy device said sponson planing surfaces provide hydrodynamic lift and whereby said front surface and said inner surfaces of said sponsons cooperate to channel air between said lower surface of said hull and said water surface such that said air is compressed and said water will separate from said lower portion of said buoyant hull such that said directed air provides supporting lift to said buoyant hull for reduced drag.

2. The aquatic toy as recited in claim 1 wherein said planing surface angle of inclination is about twenty degrees relative to said lower surface of said hull.

3. The aquatic toy as recited in claim 1 wherein said hull includes a means for enhancing directional guidance of said aquatic toy device across the surface of said body of water.

4. The aquatic toy as recited in claim 3 wherein said means for enhancing directional guidance includes at least one keel extending downwardly from and lengthwise along the lower surface of said hull.

5. The aquatic toy as recited in claim 3 wherein said means for enhancing directional guidance includes a rudder, said rudder rotatably attached to said stern portion and extending downwardly from said lower portion of said hull, said rudder being manually positionable for directional control.

6. The aquatic toy as recited in claim 3 wherein said means for enhancing directional guidance includes a rudder, said rudder rotatably attached to said stern portion and extending downwardly from said lower portion of said hull, said rudder being fixedly positionable prior to manually projecting the aquatic toy for directional control.

7. The aquatic toy as recited in claim 3 wherein said means for enhancing directional guidance includes at least one upwardly extending fin secured to said upper portion of said hull, said upwardly extending fin constructed and arranged to produce a directed airflow across said upper portion of said hull during forward motion of said aquatic toy.

8. The aquatic toy as recited in claim 7 wherein said at least one upwardly extending fin secured to said upper portion of said hull is manually positionable for directional control, prior to projecting said aquatic toy across a water surface.

9. The aquatic toy as recited in claim 7 wherein said at least one upwardly extending fin secured to said upper portion of said hull is remotely positionable for directional control.

10. The aquatic toy as recited in claim 1 wherein said means for grasping and projecting said aquatic toy device centrally positioned on said upper portion of said hull.

11. The aquatic toy as recited in claim 1 wherein said hull includes at least one means for attaching a control line, said control line constructed and arranged to allow said aquatic toy device to be pulled across said water surface.

* * * * *